United States Patent [19]

Gvoth, Jr. et al.

[11] Patent Number: 4,763,013

[45] Date of Patent: Aug. 9, 1988

[54] BACKUP PROTECTION SWITCH TO PREVENT REVERSE POWER FLOW IN A UPS

[75] Inventors: John Michael Gvoth, Jr., Haledon; Robert J. Kakalec, Madison; Henry E. Menkes, Pine Brook, all of N.J.

[73] Assignee: American Telephone and Telegraph Company, AT&T Bell Laboratories, Murray Hill, N.J.

[21] Appl. No.: 99,042

[22] Filed: Sep. 21, 1987

[51] Int. Cl.⁴ .................................................. H02J 9/04
[52] U.S. Cl. ........................................ 307/66; 307/46; 307/86; 361/84
[58] Field of Search ....................... 307/46, 64, 65, 66, 307/86; 361/84, 82, 102, 3

[56] References Cited

U.S. PATENT DOCUMENTS

| | | | |
|---|---|---|---|
| 3,614,461 | 10/1971 | Speer et al. | 307/66 |
| 3,971,957 | 7/1976 | Hase | 307/64 |
| 4,400,624 | 8/1983 | Ebert | 307/66 |
| 4,506,766 | 3/1985 | Watanabe | 307/66 |
| 4,598,330 | 7/1986 | Woodworth | 361/3 |

Primary Examiner—William H. Beha, Jr.
Attorney, Agent, or Firm—Alfred G. Steinmetz

[57] ABSTRACT

A UPS system includes a backup input line isolation switch and control circuit for energy flow in the UPS is operative, during operation of the reserve energy source portion of the power supply in supplying power to the output, to provide mechanical isolation between the primary energy source connected to the input line and the secondary energy source upon detection of a failure of an electronic isolation switch normally providing isolation between te input line and the secondary energy source or an output of the UPS.

10 Claims, 5 Drawing Sheets

BACKUP PROTECTION SWITCH TO PREVENT REVERSE POWER FLOW IN A UPS

FIELD OF THE INVENTION

This invention relates to a backup input Line Isolation switch and its control for a UPS (uninterruptible power supply), having both primary and reserve energy sources, and specifically for interrupting reverse power flow from the reserve energy source back into the primary energy source should the semiconductor electronic line isolation switches fail by mechanically separating the UPS input line from the Commercial AC Line supplying primary energy to the UPS.

BACKGROUND OF THE INVENTION

A typical UPS is one in which a primary energy source (normally a commercial AC line) and a reserve energy source (normally a battery voltage driven inverter) are both coupled to supply energy input to an energy coupling apparatus such as a transformer with two independent input windings. Each input is functional to supply power to a single output which in the case of a transformer is a single output winding. In other arrangements the two sources of energy may be joined in series so that the primary source of energy charges the reserve source. Frequently one or more direct bypass current lines are provided to directly couple thge primary energy source to the output to supply temporary surge power to the output.

When power is being supplied from the reserve energy source, the UPS is disconnected from the commercial AC line by semiconductor electronic isolation switches located in both the input and bypass lines. Electronic isolation switches are used to avoid the transients associated with the switching of mechanical switches. Should these electronic isolation switches fail however in a conducting mode, power supplied by the reserve energy source may be fed back into the primary line source either directly through the energy coupling apparatus from the inverter driven by the reserve energy source or from the UPS output via the bypass line depending upon the power transfer topology used. There generally is no indication of this failure until a current path is accidentally completed across the AC line permitting such current flow. This is a potential safety hazard which is often not apparent until such a current path is completed.

SUMMARY OF THE INVENTION

Therefore in a UPS system, embodying the principles of the invention, a backup input line isolation switch and a control circuit is operative, during operation of the reserve energy source portion of the power supply in supplying power to the output, to provide mechanical isolation between the primary energy source connected to the input line and the secondary energy source upon detection of a failure of an electronic isolation switch normally providing isolation between the input line and the secondary energy source or an output of the UPS. Detecton of such a failure is accomplished by means of a dummy load which is connected in shunt across the input line. Its impedance is sized to permit a small low level current flow, above normal leakage current levels permitted by a functioning semiconductor electronic line switch, if energy is reverse coupled from the reserve energy source via a failed electronic line switch or back from the output if the UPS has a failed electronic bypass switch without draining significant power from the primary energy source when the UPS is normally operative and deriving power from the primary energy source. Current sensing apparatus detects this reverse current flow exceeding normal leakage current levels in the input line portion of the UPS which is closely adjacent to the primary energy source. Monitoring circuitry is provided to test and indicate when the UPS is in a reserve mode of operation. These two tests, indicating that the UPS is in a reserve mode of operation and that an electronic isolation switch has failed, are operative to activate apparatus to trip a mechanical isolation switch separating the input from the primary energy source.

This arrangement isolates the reserve energy source and/or the output of the UPS, depending on the circuit topology, from the input AC line of the primary energy source by a mechanical switch upon failure of the electronic line and/or bypass isolation switch and prevents a coupling of energy from either the output or the reserve energy source to the input AC line in the event that any of the electronic isolation switches should fail.

DETAILED DESCRIPTION

Figure 1:
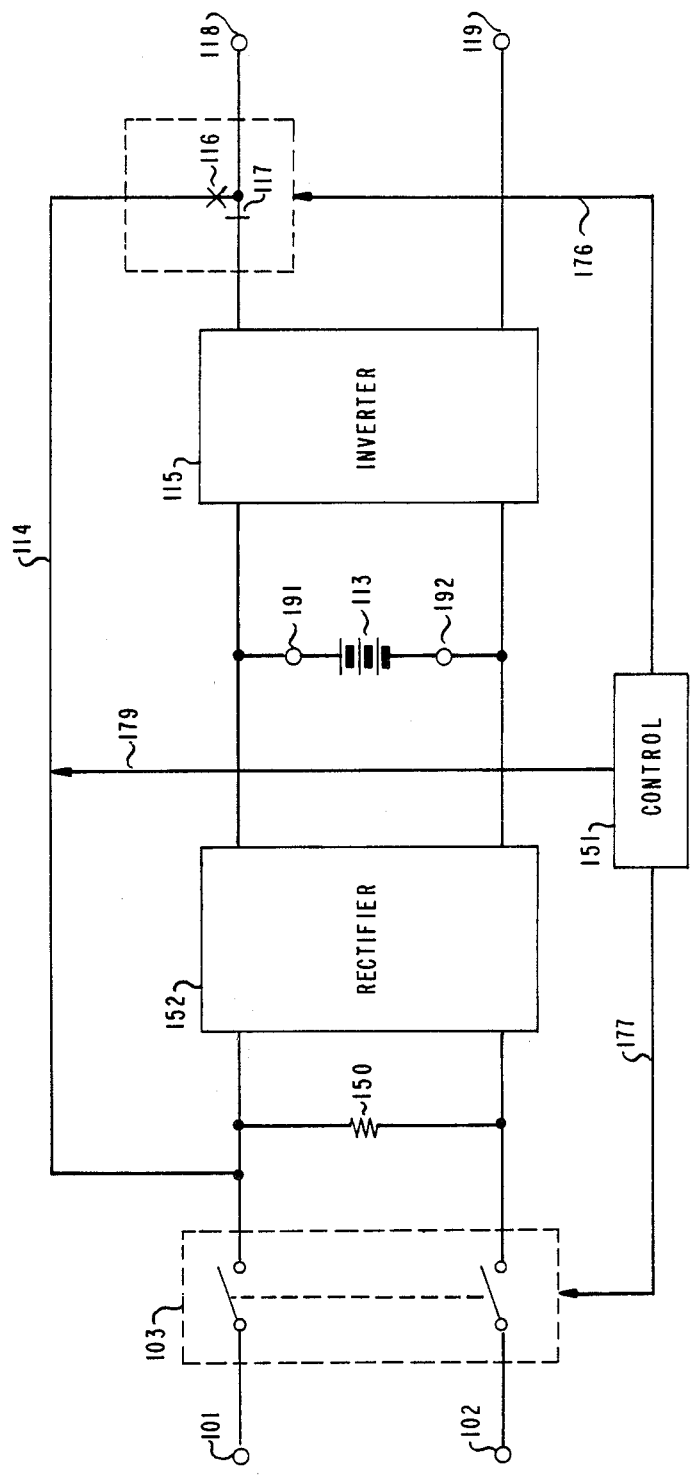
FIG. 1 is a block diagram of a series type of UPS including a mechanical isolation arrangement embodying the principles of the invention.

A block diagram of a series UPS is shown in FIG. 1 in which commercial AC power at inputs 101 and 102 is rectified by rectifier 152 to charge the battery 113 and drive the inverter 115. The series insertion of the rectifier 152 protects the inverter 115 and its outputs 118 and 119 from AC line transients. In the event of an AC outage, the power to the output is supplied to the outputs 118 and 119 from the battery voltage of battery 113.

A bypass line 114 is provided to directly couple the input 101 to the output 118 and is used to service a load connected thereto during momentary overload requirements beyond the inverter capacity or in the event that the inverter has failed. Included in the bypass line 114 is a solid state or electronic isolation switch 116 which is used to open the bypass line 114 so that power is not fed back from the output 118 to the input 101. Bypass switch 116 has a related switch 117 which opens when 116 conducts the prevent current flow into the inverter 115.

A control circuit 151 is included which monitors the status of the bypass switch, via lead 176, and is also connected to sense current flow in the bypass lines 114, via lead 179. If a current flow, drawn by dummy load 150, is detected when the bypass switch 116 is supposed to be open (nonconducting), a control signal is applied via lead 177, to activate relay switch 103 and isolate the inputs 101 and 102 from the rectifier 152. This prevents reverse current flow from the bypass line 114 to input 101 which could create a safety hazard.

Figure 2:
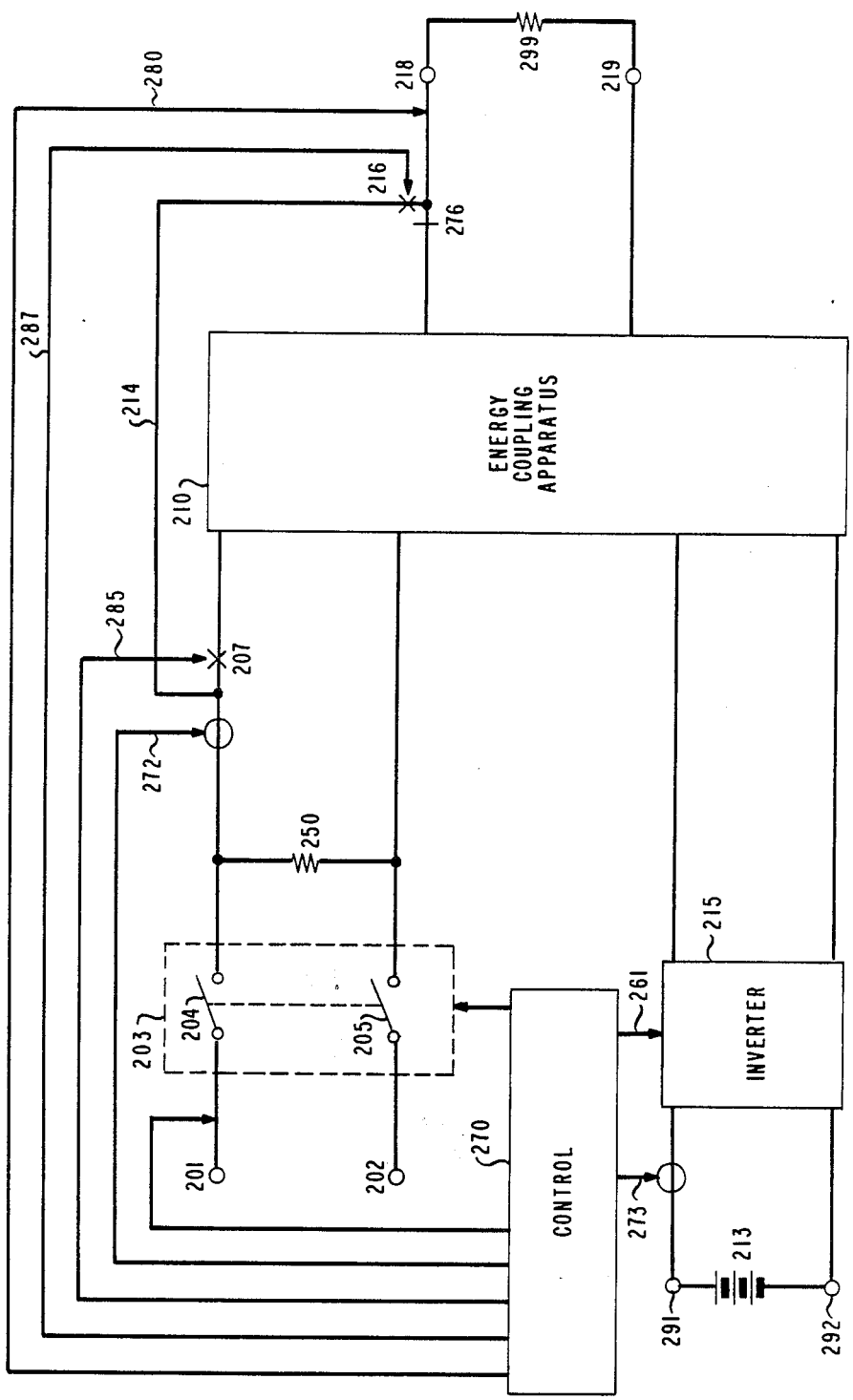
FIG. 2 is a block diagram of a parallel type of UPS including a mechanical isolation arrangement embodying the principles of the invention.

A block diagram of a UPS having the reserve and primary sources of energy connected in parallel to an energy coupling apparatus 210 is shown in FIG. 2. The primary energy source, which may be commercial AC is connected to input terminals 201 and 202 which are coupled, via a semiconductor electronic line switch 207, to the energy coupling apparatus 210. The electronic line switch 207 is opened by control 270, via lead 285, to disconnect the primary energy source from the energy coupling apparatus 210 if power is derived from the reserve energy source. A mechanical relay switch 203 has contacts 204 and 205 included in the send and return leads of the input to provide back up mechanical isolation from the primary energy source in accord with the below description. A dummy resistor 250 is connected across the input line just subsequent to the relay switch 203 to provide a current path to enable reverse current flow.

Reserve energy is derived from a battery 213, connected to reserve input terminals 291 and 292, and whose DC voltage is converted into AC by the static inverter 215 and applied to the energy coupling apparatus 210. A control circuit 270 monitors the magnitude and quality of the input AC, via lead 271, and determines whether the energy at the outputs 218 and 219 shall be derived from the primary energy source or the reserve energy source. The control circuit also controls the phase of the AC signal generated by the inverter, via lead 261, in order to control whether it delivers power to the output or not. In one method of control, the phase of the inverter output signal is controlled relative to the phase of the UPS output signal. This information may be derived from lead 280 connected to the output 218.

The active input line is directly connected to the corresponding output line via the bypass lines 214. The bypass line includes an electronic bypass line isolation switch, controlled via lead 287, and having the contacts 216 and 276. The bypass line isolation switch contact 216 is enabled conducting to supply surge current to the output when needed. If it fails in a conducting mode power can be coupled from the output to the input from the reserve energy source. The switch 216 as shown includes a complementary switch 276 coupled to it to prevent power backflow into the energy coupling apparatus 210 when the bypass lines are conducting.

A dummy load 250 of fairly high resistance is connected across the input line just subsequent to the relay switch 203 and permits a current flow above leakage current values should any of the semiconductor electronic isolation switches 207 and/or 216 fail conducting. This current flow is sensed by the control circuit 270, via lead 272. The control circuit 270 also senses battery current via lead 273. Upon detection of the line current when the UPS is in a mode of operation in which energy to the output is derived from the battery 213 which supplies sensed current, the control circuit 270 through lead 289 causes the relay switch 203 to operate and open the two input lines by opening the two switch contacts 204 and 205.

Figure 3:
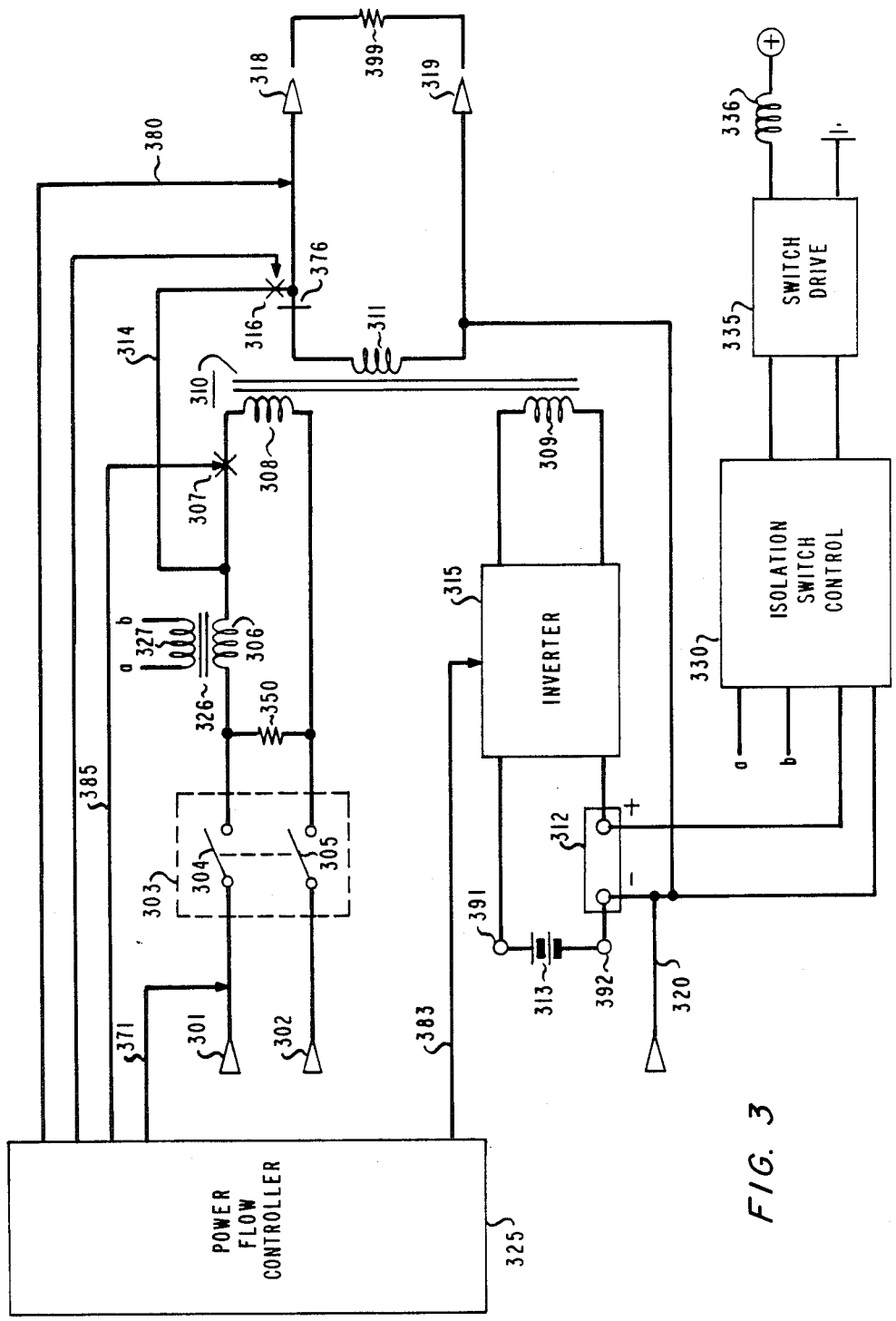
FIG. 3 is a more detailed block and schematic diagram of the parallel processing UPS of FIG. 2 including the backup line isolation switch and its control circuitry.

A schematic of the power train of an UPS (uninterruptible power supply) is shown in FIG. 3. Commercial AC from an AC input line is supplied to the input terminals 301 and 302. The input terminals are connected through a mechanical circuit breaker 303 with breaker contacts 304 and 305 in each input line and through a current sense transformer winding 306 and a semiconductor electronic line switch 307 (which may comprise SCRs or similar electronic devices) to the primary winding 308 of a high reactance transformer 310.

Power may also be supplied by a reserve voltage source 313 which is connected to energize a static inverter 315 which may comprise a push-pull type, a bridge type or equivalent type static inverter circuit. The inverter output is connected to the transformer winding 309 which is the second primary winding of transformer 310. The secondary winding 311 of transformer 310 is connected through a semiconductor isolating switch 376 to output terminal 318. Output terminal 319 is connected to line neutral 320 as is the lower terminal of winding 311 and one terminal of the voltage source 313. A bypass line 314 directly couples the input to the output via an electronic switch 316 which also is associated with its complementary switch 376.

During normal operation when the primary input AC voltage source is considered satisfactory, power is supplied to the output terminals 318 and 319 solely by the input energy supplied by the primary AC source at terminals 301 and 302. If the AC input voltage decreases below an acceptable value, the power output at terminals 318 and 319 is derived from the reserve energy source 313 which the inverter 315 inverts into AC and applies to transformer winding 309. In this power flow control arrangement, the inverter 315 runs continuously even when the input AC at input terminals 301 and 302 is acceptable. Power flow from the inverter to the output is regulated by controlling the phase of the power signal at winding 309 relative to the phase of the load signal at output terminals 318 and 319. Power flow is under control of a power flow controller 325 which monitors the phase of the input AC via lead 371, and the phase of the output signal via lead 380 and controls the inverter 315, via lead 383, to generate a signal at the appropriate phase for achieving the desired power flow. The power flow controller 325 also disables a semiconductor electronic line switch 307 through lead 385 (to a nonconducting state) to disconnect the input AC from the primary winding when the inverter 315 is supplying power to the output. Another electronic switch 376 is opened (nonconducting) when a bypass switch 316 is closed (conducting) to directly couple the input terminal 301 to the output terminal 318 in instances when the output load demands a heavy duty start-up current. A detailed explanation of power flow control in a parallel processing UPS by controlling the relative phase of the inverter output and the UPS output and an operative system to control it is described in detail in U.S. Pat. No. 4,400,624 and, hence, is not discussed herein.

When the inverter 315 is operative to supply power to the output load that is derived from the barrery or voltage source 313, the power flow controller 325 is operative to open both the line switch 307 and the bypass switch 316 so that there is no coupling of the inverter's output power to the input terminals 301 and 302 and hence to the commercial AC line. It is apparent that a failure of either one of the switches 307 or 316 creates a definite safety hazard by feeding power back to the disabled primary energy source which is normally the commercial AC line. It is desirable to effectively detect these failures and to reliably isolate the AC line from the UPS in order to prevent the reserve power output of the inverter from energizing the AC line and creating a safety hazard.

A reliable safety arrangement is provided by the addition of a mechanical isolating switch 303 which is operative to isolate the UPS from the AC line should the line or bypass electronic switch 307 and/or 316 fail in a shorted or conductive mode. Accordingly, a mechanical switch 303 is included which has two contacts 304 and 305 located just subsequent to the input terminals 301 and 302. If either electronic switch 307 or 316 fails, the mechanical isolation switch is activated, by the isolation switch control 330, to open the normally closed contacts 304 and 305.

The operation of the mechanical isolation switch 303 to open the contacts 304 and 305 is under control of the isolation switch control 330 which monitors the integrity of the electronic switches 307 and 316 via lead connections a and b connected to current sense winding 327 when the output power is being supplied by the inverter 315 and operates the switch drive 335 to activate a relay coil 336 to open contacts 304 and 305 when a failure of electronic switch 307 and/or 316 is detected.

The isolation switch control circuit 330 is responsive to current flow detected current sense winding 306 in the input line when the UPS is in its reserve power mode when the inverter output is used to supply power to the output load 399.

A dummy load 350 having a very high impedance value is shunted or connected across the input line just subsequent to the contacts 304 and 305 of the mechanical isolation switch 303. This dummy load is operative to draw a small low level current flow from the reserve energy source which is greater than the normal leakage current if either electronic switch 307 or 316 has failed conducting. This current is sensed through winding 306 of the current sense transformer 326. Its secondary winding 327 is coupled via terminals a and b to the isolation switch control 330.

The isolating switch control 330 is operative to determine if the UPS is operating in its reserve energy mode and if the sensed current is greater than the leakage current value. It may ascertain this by sensing the current output of the battery at the current shunt 312 or alternatively (not shown) by a control signal from the power flow controller 325. Upon determining that the UPS is in a reserve mode of operation, a sensed current flow above leakage current levels in sensing winding 306 is operative to cause a switch drive to be activated to energize the relay coil 336 and hence cause the contacts 304 and 305 of the mechanical isolation switch 303 to open.

Figure 4:
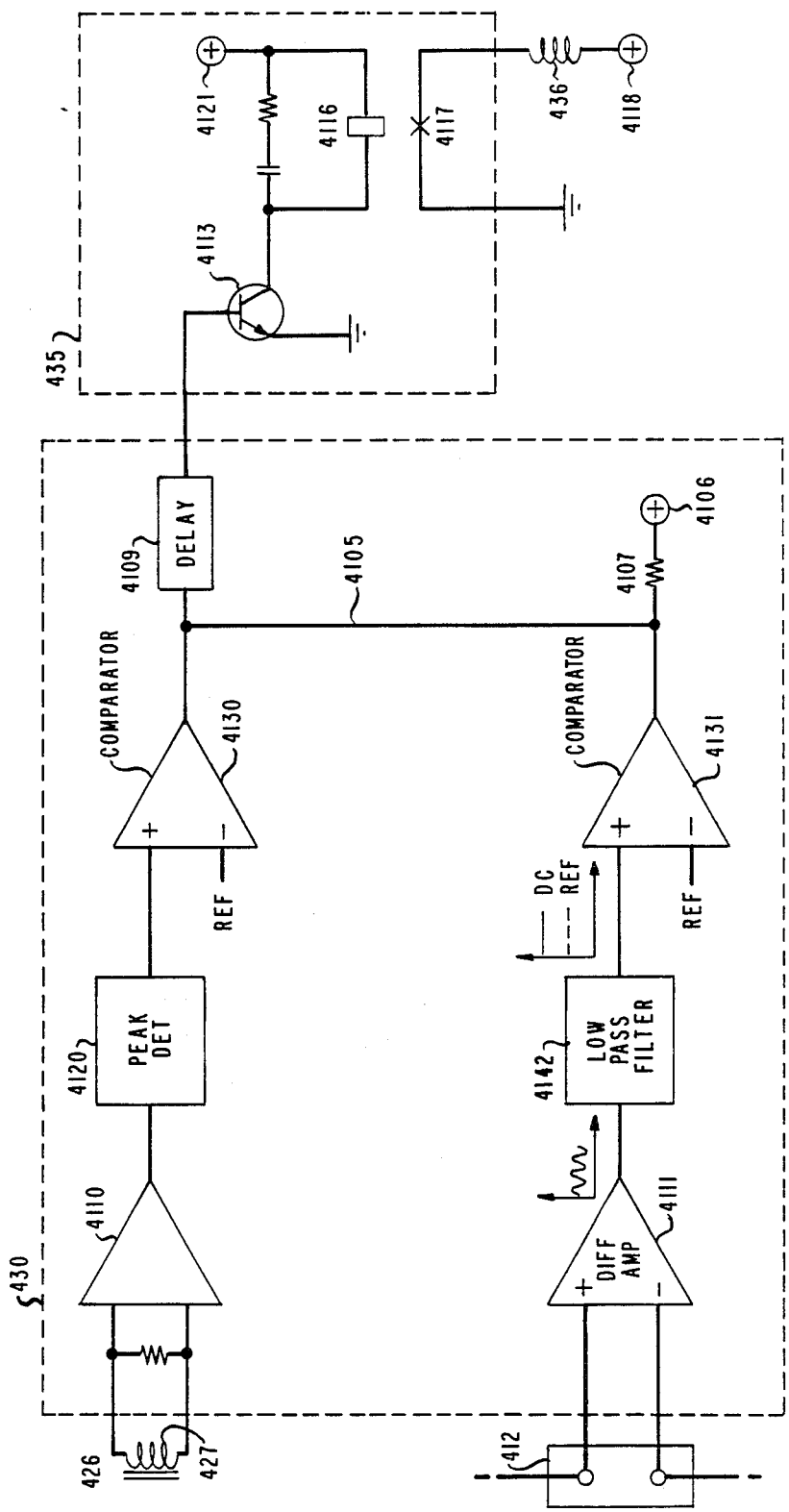
FIG. 4 is a detailed block and schematic diagram of a control circuitry to operate the backup isolation switch at the junction of the primary energy source and the input line to the UPS shown in FIG. 3.

A more detailed schematic of the isolating switch control 330, switch drive 335 and relay coil 336 is shown in FIG. 4. This particular control arrangement 430 indentifies the reserve mode of operation of the UPS by monitoring the battery current at current shunt 412, although other methods of identifying reserve operation may be utilized without departing from the spririt and scope of the invention.

The input line current is sensed through transformer 426 and is applied to an amplifier 4110 whose input is connected to the secondary winding 427 of the current sense transformer 426. The output of amplifier 4110 is applied to a peak detector 4120 which converts the AC voltage level to a DC voltage level. The DC voltage is applied to a comparator 4130 which compares it with a reference voltage to determine if the current level is greater than that of the normal leakage current. If this voltage exceeds the reference voltage, an output impedance state generated by the comparator 4130 is applied to lead 4105 which is connected through resistor 4107 to a voltage source at terminal 4106.

When energy is being derived from the primary source (i.e., from Commercial AC), no current is drawn from the reserve energy source which is normally a battery voltage source. During the reserve mode of operation current is drawn from the battery voltage source to supply the ouput power. This output current is directionally distinguished from charging current supplied during the primary source mode of operation. The battery output current is sensed at current shunt 412, and the voltage representative of this current is applied to the differential amplifier 4111 which responds to the correct output current polarity and whose output is applied to a low pass filter 4121 which in turn derives a DC voltage therefrom. A comparator circuit 4131 compares this DC voltage with a reference voltage and has a controlled output impedance state responsive to this comparison which is connected to lead 4105.

The output of each comparator 4130 and 4131 is a high state when its applied input voltage exceeds the reference voltage. When the output of the both comparators 4130 and 4131 is high, a current is enabled to flow through resistor 4107 into a delay circuit 4109 which after a short time interval charges a capacitor to a level where its output is sufficient to bias transistor 4113 conductive. A current flow is supplied by a voltage source 4121 and operates a first relay coil 4116 and its related contact 4117 which, in turn, permits current flow from voltage source 4118 to energize the coil 436 of the mechanical isolation switch. Energized coil 436 enables the opening of the contactors 304 and 305 shown in FIG. 3, and disconnects the inputs of the UPS from the commercial AC line or primary energy source.

Figure 5:
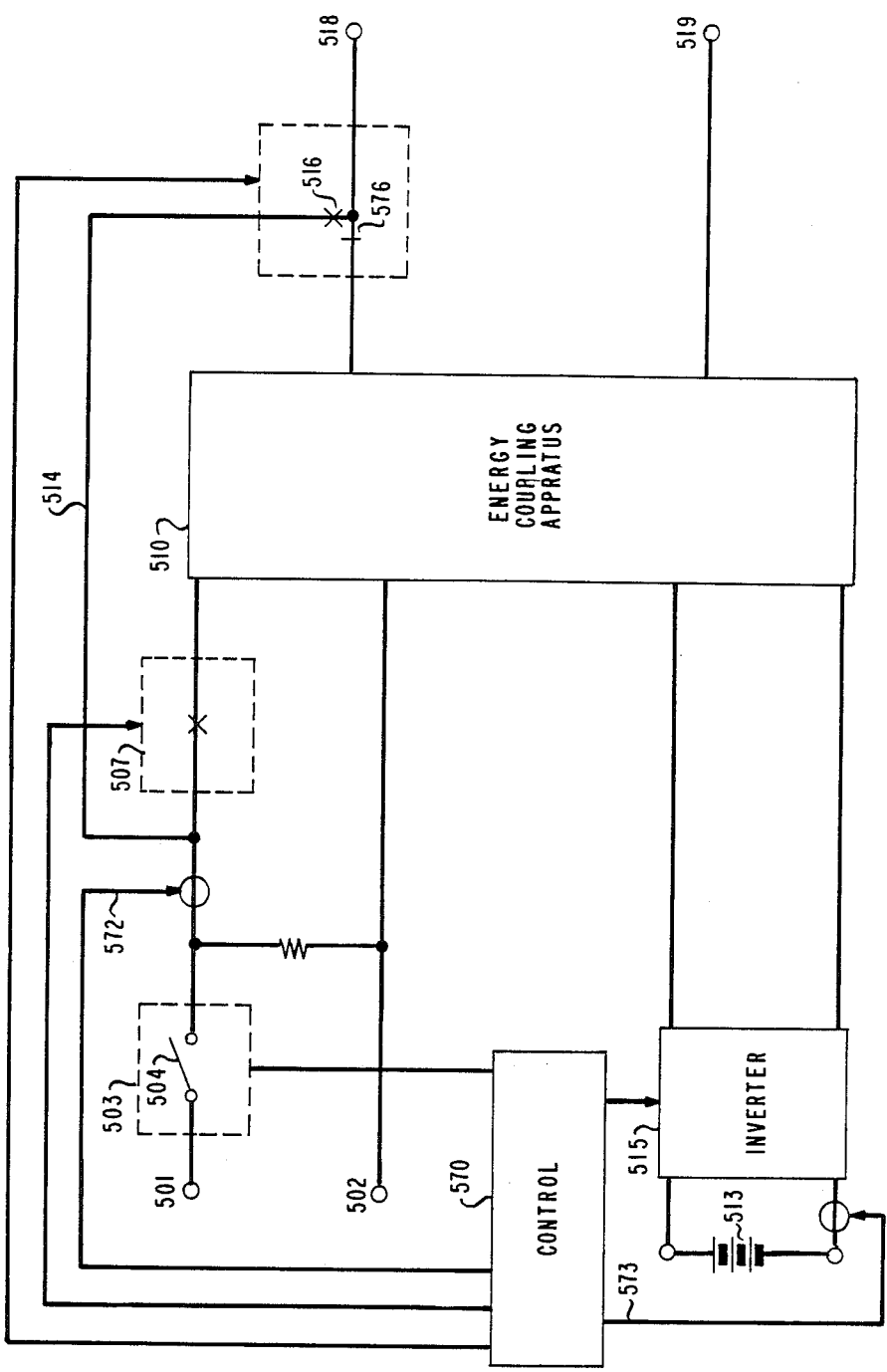
FIG. 5 is a block diagram of a parallel type of UPS for operating between phase and neutral and including a bypass line.

Another parallel processing UPS adapted to be connected between phase and neutral of a three phase source is shown in FIG. 5. Input terminal 501 is connected to a phase line of the primary source and input terminal 502 is connected to its neutral. The input line connected to terminal 501 has a bypass line 514 which directly connects it to the output terminal 518 respectively. Reserve power is supplied through the static inverter 515. Electronic line switch 507 and electronic bypass switch 516 are opened when output power is supplied by the reserve power source 513 in order to prevent reverse power flow into the primary source connected to input terminals 501 and 502. Should these switches fail, current flow sensed by leads 572 and 573 indicating reverse current flow to the primary source causes the control 570 to activate mechanical switch 503 to open contact 504 and mechanically isolate the input terminals 501 and 502 from the reserve energy source.

While the invention as applied to a parallel processing UPS has been described above in the context of a parallel processing UPS using phase control to control power flow from a reserve energy powered continuously operating inverter to the output; it is to be understood that the protection arrangement is equally applicable to those UPS arrangements in which the inverter powered by reserve energy does not run continuously but is turned on only upon failure of the primary power source.

What is claimed is:
1. In combination:

an uninterruptible power supply, comprising;
a first input for accepting a primary source of energy,
a second input for accepting a reserve source of energy,
an output for accepting a load to be energized,
energy coupling means for coupling energy from the first and second inputs to the output,
at least a first energy path including the energy coupling means for permitting energy flow from the second input to the first input,
primary means for disabling energy flow in the first energy path when energy flow to the output is derived from the reserve source of energy connected to the second input,
means for detecting a failure of the primary means for disabling energy flow,
secondary means for disabling connection of the first energy path to the first input in response to the means for detecting a failure.

2. In combination:
an uninterruptible power supply, comprising;
a first input for accepting a primary source of energy,
a second input for accepting a reserve source of energy,
an output for accepting a load to be energized,
an energy coupling apparatus for coupling energy from the first and second inputs to the output,
at least a first energy path including the energy coupling apparatus for permitting energy flow from the second input to the first input,
primary means for disabling energy flow in the first energy path when energy flow is connected through the energy coupling apparatus from the second input to the output,
means for detecting a failure of the primary means for disabling energy flow,
secondary means for disabling connection of the first energy path from the first input in response to the means for detecting a failure.

3. In combination:
an uninterruptible power supply, comprising;
a first input for accepting a primary source of energy,
a second input for accepting a reserve source of energy,
an output for accepting a load to be energized,
an energy coupling apparatus for coupling energy from the first and second inputs to the output and capable of coupling energy from the second input to the first input,
a primary disconnect switch for decoupling the first input from the energy coupling apparatus when energy is being supplied to the output from the second input,
a backup disconnect switch for disabling energy flow from a reserve energy source connected to the second input into the first input,
means for facilitating a flow of energy from the second input to the first input should the primary disconnect switch fail in a mode enabling energy flow through the primary disconnect switch.
means for sensing reverse energy flow from the energy coupling apparatus to the first input,
means for ascertaining when energy is being supplied to the output from the second input,
means responsive to concurrence of the means for sensing and the means for ascertaining for activating the backup disconnect swtich.

4. In combination:
an uninterruptible power supply, comprising;
a first input for accepting a primary source of energy,
a second input for accepting a reserve source of energy,
an output for accepting a load to be energized,
an energy coupling apparatus for coupling energy from the first and second inputs to the output and capable of coupling energy from the second input to the first input,
a bypass line connecting the first input to the output and a second disconnect switch for disabling the bypass line, and
a primary disconnect switch for decoupling the first input from the energy coupling apparatus when energy is being supplied to the output from the second input,
a backup disconnect switch for disabling energy flow from the second input to the first input and from the output to the first input via the bypass line,
means for facilitating a flow of energy from the second input to the first input should the primary disconnect switch fail in a mode enabling energy flow through the primary disconnect switch,
means for sensing energy flow from the second input to the first input,
means for ascertaining when energy is being supplied to the output from the second input,
means responsive to concurrence of the means for sensing and the means for ascertaining for activating the backup disconnect switch.

5. In combination:
an uninterruptible power supply, comprising;
a first input for accepting a primary source of energy,
a second input for accepting a reserve source of energy,
an output for accepting a load to be energized,
a power transformer having first and second primary windings coupled to the first and second inputs respectively and a secondary winding connected to the output; and the power transformer being capable of coupling energy from the second input to the first input,
a primary semiconductor disconnect switch for decoupling the first input from the power transformer when energy is being supplied to the output from the second input,
a backup mechanical disconnect switch for disabling energy flow from a reserve energy source connected to the second input into the first input,
a high impedance conducting path shunting the input sized for facilitating a flow of energy greater than leakage current levels from the second input to the first input should the primary semiconductor disconnect switch fail in a shorted mode enabling energy flow through the primary semiconductor disconnect switch,
a first current flow sense device for sensing reverse energy flow from the power transformer to the first input,
a second current flow sense device for ascertaining when energy is being supplied to the ouput from the second input,
control circuitry responsive to concurrence of energy flow in the first and second current flow sense devices for activating the backup mechanical disconnect switch.

6. In combination:
an uninterruptible power supply, comprising;

a first input for accepting a primary source of energy,
a second input for accepting a reserve source of energy,
an output for accepting a load to be energized,
a power transformer having first and second primary windings coupled to the first and second inputs respectively and a secondary winding connected to the output; and the power transformer being capable of coupling energy from the second input to the first input,
a bypass line connecting the first input to the output,
a primary semiconductor disconnect switch for decoupling the first input from the power transformer and a bypass semiconductor switch for disabling conduction in the bypass line when energy is being supplied to the output from the second input,
a backup mechanical disconnect switch for disabling current flow from a reserve energy source connected to the second input into the first input,
a high impedance conducting path shunting the input sized for facilitating a flow of current greater than leakage current levels from the second input to the first input should at least one of the primary semiconductor and bypass semiconductor disconnect switches fail in a shorted mode,
a first current flow sense device for sensing reverse current flow from the power transformer to the first input,
a second current flow sense device for ascertaining when energy is being supplied to the output from the second input,
control circuitry responsive to concurrence of current flow in the first and second current flow sense devices for activating the backup mechanical disconnect switch.

7. In combination:
an uninterruptible power supply, comprising;
a first input for accepting a primary source of energy,
a second input for accepting a reserve source of energy,
an output for accepting a load to be energized,
a power transformer having first and second primary windings coupled to the first and second inputs respectively and a secondary winding connected to the output; and the power transformer being capable of coupling energy from the second input to the first input,
a bypass line connecting the first input to the output,
a primary semiconductor disconnect switch for decoupling the first input from the power transformer and a bypass semiconductor switch for disabling conduction in the bypass line when energy is being supplied to the output from the second input,
a backup mechanical disconnect switch for diabaling current flow from a reserve energy source connected to the second input into the first input,
a high impedance conducting path shunting the input sized for faciltating a flow of current greater than leakage current levels from the second input to the first input should at least one of the primary semiconductor and bypass semiconductor disconnect switches fail in a shorted mode,
a current sense transformer having a primary winding connected for sensing reverse current flow from the power transformer to the first input,
a current shunt device connected for ascertaining current flow into the second input when energy is being supplied to the output from the second input,
control circuitry responsive to concurrence of current flow in the first and second current flow sense devices, comprising;
a peak detector coupled to a secondary winding of the current sense transformer,
a first comparator fro comparing a current level of the peak detector with a first reference level set to identify current levels above leakage current levels,
a second comparator connected for comparing current in the current shunt device with a second reference level, and
circuitry responsive to the output states of the first and second comparators for activating the backup mechanical disconnect switch.

8. In combination:
an uninterruptible power supply comprising;
a first input for accepting a primary AC voltage source,
a rectifier connected to receive AC voltage applied to the input and supply a rectified DC voltage,
a static inverter having a signal input arrangement connected to receive the rectified DC voltage and generate an AC voltage signal and an inverter output,
a second input for accepting a reserve DC voltage source and connected in parallel with the signal input arrangement of the inverter,
the output of the inverter adapted for accepting a load to be energized,
a bypass line for directly connecting to the first input to the output of the inverter,
an electronic switch for disabling the bypass line,
means for detecting a failure of the electronic switch,
a mechanical switch responsive to the means for detecting a failure of the electronic switch and positioned for disconnecting the first input from the bypass line and from the rectifier.

9. An uninterruptible power supply in which an electronic switch failure may permit reverse energy flow from a reserve source of energy into a primary source of energy, comprising:
a first input for accepting a primary source of energy,
a second input for accepting a reserve source of energy,
an output for accepting a load to be energized,
energy coupling means for coupling energy from the first and second inputs to the output,
an electronic switch for disabling reverse energy flow into the first input when energy flow to the output is derived from the reserve source of energy connected to the second input,
means for detecting a failure of the electronic switch for disabling reverse energy flow,
a mechanical switch for disabling reverse energy flow to the first input operative in response to the means for detecting a failure.

10. An uninterruptible power supply in which a switch failure may permit reverse energy flow from a reserve source of energy into a primary source of energy, comprising:
a first input for accepting a primary source of energy,
a second input for accepting a reserve source of energy,
an output for accepting a load to be energized,
an energy coupling apparatus for coupling energy from the first and second inputs to the output, a primary switch for disabling reverse energy flow into the first input' when energy flow is connected through the energy coupling apparatus from the second input to the output, means for detecting a failure of the primary switch for disabling reverse energy flow, a secondary switch for disabling reverse energy flow into the first input operative in response to the means for detecting a failure.

* * * * *